UNITED STATES PATENT OFFICE.

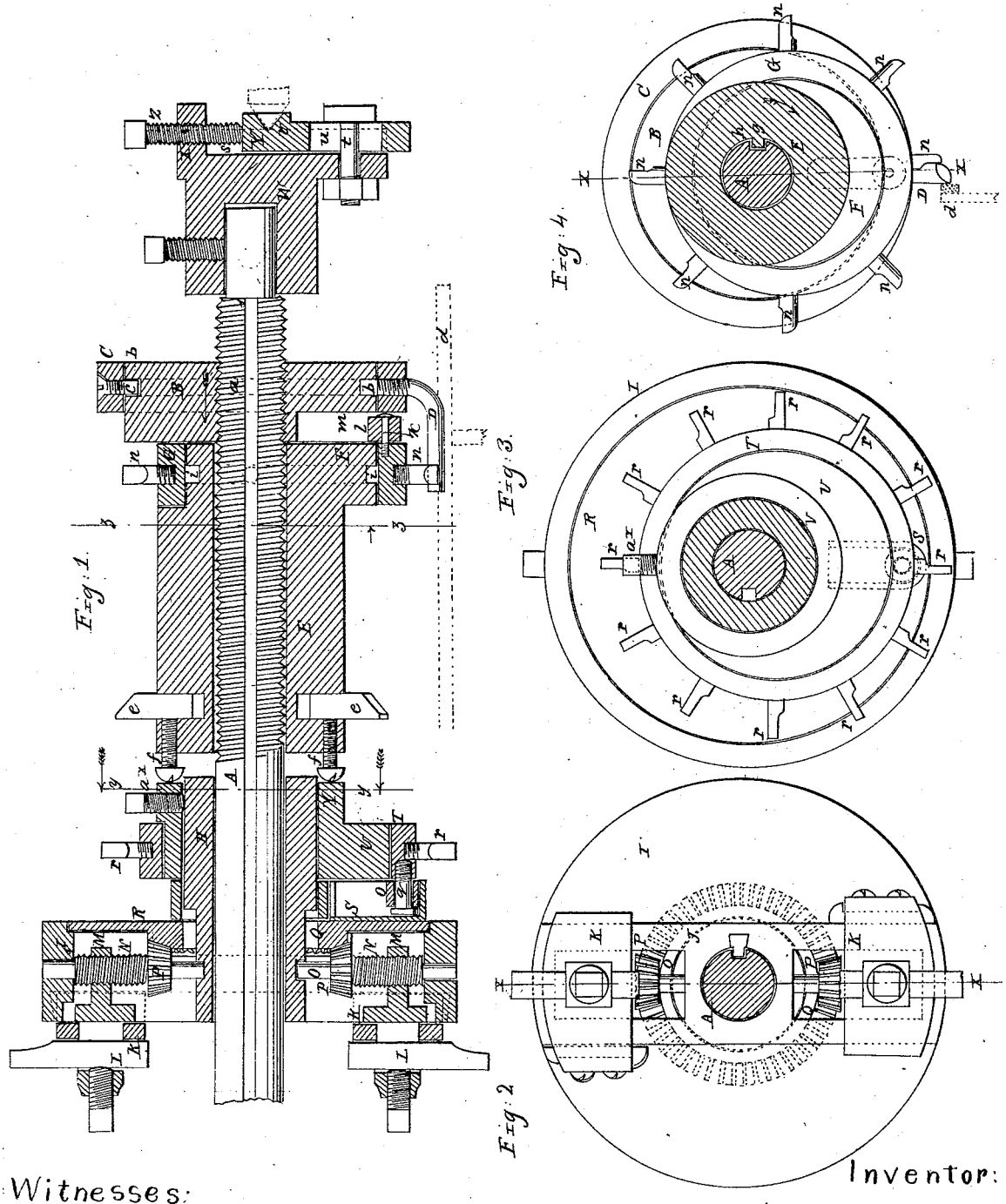

JOHN C. CHAPMAN, OF CHARLESTOWN, MASSACHUSETTS.

IMPROVEMENT IN BORING AND SQUARING OFF CYLINDERS.

Specification forming part of Letters Patent No. 37,384, dated January 13, 1863.

*To all whom it may concern:*

Be it known that I, JOHN C. CHAPMAN, of Charlestown, in the county of Middlesex and State of Massachusetts, have invented a new and improved implement or device for boring cylinders and other articles and squaring or facing off the ends of the same; and I do hereby declare that the following is a full, clear, and exact description of the same, reference being had to the accompanying drawings, making a part of this specification, in which—

Figure 1 is a longitudinal central section of my invention, taken in the lines $x\,x$, Figs. 2 and 4; Fig. 2, an end or face view of the squaring-off implement; Fig. 3, a transverse section of the same, taken in the line $y\,y$, Fig. 1; Fig. 4, a transverse section of the boring implement, taken in the line $z\,z$, Fig. 1.

Similar letters of reference indicate corresponding parts in the several figures.

The object of this invention is to obtain an implement or device which may be applied to an ordinary turning-lathe and made to operate in the way of boring and squaring or facing off the ends of metal cylinders or other articles equally as well as the more pretentious and comparatively expensive machines which are now made for such purposes.

To enable those skilled in the art to fully understand and construct my invention, I will proceed to describe it.

A represents an arbor on which the implement is fitted. This arbor is placed in a lathe in the usual way, and it has a screw thread, $a$, upon it of a requisite length, on which a nut, B, is fitted. This nut is of circular form, and it has a groove, $b$, made in its periphery, into which a screw, $c$, fits, said screw passing through a ring, C, which encompasses the nut, and which is held stationary as the arbor A rotates, in consequence of a projection, D, on the ring being in contact with a rest or bearing, $d$, attached to the lathe. The nut B is allowed to turn freely within the ring G.

E is a cylindrical head or stock, which has cutters $e\,e$ attached to it. These cutters are fitted in radial holes made in the head or stock, and are secured therein by set-screws $f$, as shown clearly in Fig. 1. The head or stock is allowed to slide freely on the arbor A, and is made to turn with it, in consequence of having a projection, $g$, which fits in a longitudinal groove, $h$, in the arbor. (See Fig. 4.) At the end of the head or stock opposite to that where the cutters are secured there is an eccentric, F. The eccentric and head or stock may be cast in one piece, and the former has a groove, $i$, made in its periphery, in which a screw or pin fits that passes through a ring, G, which encompasses it. The ring G is allowed to turn freely on the eccentric, and the former has a pin, $k$, projecting horizontally from it, on which a friction-roller, $l$, is placed. This friction-roller is fitted in a groove or slot, $m$, made radially in the contiguous side of the nut B. In the periphery of the ring G there are inserted radially a number of pins, $n$, which, in consequence of the eccentric F, are made to strike the projection D. When the arbor A is rotated in the lathe, the head or stock E, eccentric F, ring G, and nut B all rotate with it, the ring C, in which the nut B is fitted, being alone stationary. The cylinder or other article to be bored is fixed permanently in the lathe, the cutter head or stock E turning within it, and the cutters $e\,e$ performing the work. The feed movement of the cutter head or stock is produced by the nut B, ring G, pins $n$, screw $a$, arbor A, and eccentric F, the lathe at every revolution of the cutter-head causing a pin $n$ to come in contact with the projection D, and thereby arresting the rotation of the ring G and nut B. This intermitting cessation of the rotation of the nut B produces the feed, for when the nut is stationary the screw in the arbor A will feed the cutter-head along. The extent of the feed movement at each revolution of the cutter-head will be in accordance with the number of pins $n$ on ring G. If eight pins be used, as shown in Fig. 4, there will be a feed movement equal to one-eighth of the pitch of the screw $a$, at each revolution of the arbor A. If seven pins be used, there would be a feed movement equal to one-seventh of the pitch, and so on. It will be understood, of course, that the ring C moves with the cutter head or stock E during its feed movement, as the former is connected with the nut B, and the projection D is allowed to slide along on the rest or bearing $d$.

The parts above described constitute the boring tool or implement. The squaring or facing off tool is but a simple modification of the boring-tool. In the former the cutter head is formed of a cylinder, H, having a circular plate, I, at one end, with a dovetail projection, J, on the face of the latter. On this projection, J there are fitted two slides, K K, each of which has a cutter, L, fitted to it. The slides K K have each a nut, M, attached to their inner sides, in which screws N N work, said screws both having left-hand threads. These screws N N are on one and the same shaft, O, and on said shaft there are placed two bevel-gears, P P, which gear into a toothed rim, Q, on a circular disk, R, which is fitted in a recess in the back of the circular plate I. The plate I has a radial guide, S, attached to it to receive a friction-roller, $o$, which is placed on a pin, $q$, that projects from a ring, T, the periphery of which is provided with pins $r$, like those of ring G in the tool first described. The ring T is fitted on an eccentric, U, which has a collar, V, attached to it, the latter being concentric with the cylinder H, and secured thereon by a set-screw, $a^\times$. The cylinder H is fitted on the arbor A in precisely the same way as the cylinder or cutter head E, and the ring T is operated by the eccentric U and a rest or bearing in the same way as the ring G. The ring T, however, acts upon the plate I, instead of a nut, and the cessation of the rotary movement of this plate causes the gears P P to be turned, and consequently the screws N N, and the slides K K, to which the cutters are attached, are gradually fed outward, and the flange or end of a cylinder squared or faced off at right angles to the cylinder. This latter modification, it will be seen, does not, while performing this work, require any feed movement on the arbor, the cutters L having the feed movement given them in a direction at right angles to the arbor, the cylinder or other article operated upon being stationary. This squaring or facing off tool may also be used as a boring-tool for boring holes of larger diameter than the one previously described by placing it on the arbor A in front of the cutter head or stock E, the latter feeding the former along to its work.

Taper holes are bored with this invention by setting one end of the arbor A out of line with its center. This is effected as follows: The end of the arbor is fitted in a socket, W, (see Fig. 1,) which has a bar or plate, X, at its inner end. In this bar or plate X there is made longitudinally a groove, $s$, in which a slide, Y, is fitted, and secured at any point by a bolt, $t$, which passes through a slot, $u$, in the slide, and a set-screw, Z, which passes through one end of the bar or plate X and bears against one end of the slide Y. The slide Y has a hole, $v$, made in it to receive the center point, and by adjusting the slide Y the center point, $w$, may be thrown more or less out of line with the axis of the cylinder or other article to be bored, and the taper hole thereby formed or bored.

Having thus described my invention, what I claim as new, and desire to secure by Letters Patent, is—

1. The cylinder or cutter head or stock E, with eccentric F attached, in combination with the ring G, placed on the eccentric and having its periphery provided with pins $n$, and the nut B, fitted within the ring C and connected with the ring G through the medium of the slot or groove $m$ and roller $l$, the above parts being fitted on the arbor A, as shown, and all arranged to operate as and for the purpose herein set forth.

2. The cylinder H, with the eccentric U, having the ring T fitted on it, with pins $r$ attached, in combination with the plate I, provided with the toothed rim Q, the screw-shaft O, gears P P, and cutter-slides K K, all arranged substantially as and for the purpose set forth.

3. The socket W, when arranged with a slide, Y, containing the hole $v$ for the center point, as shown; but this I claim only when used with the implement or tools herein shown and described.

JOHN C. CHAPMAN.

Witnesses:
CHAS. ROBINSON, Jr.,
C. P. DAVIDSON.